US010011054B1

(12) United States Patent
Lee

(10) Patent No.: US 10,011,054 B1
(45) Date of Patent: Jul. 3, 2018

(54) CUTTER FOR TRIMMING TREAD OF TIRE

(71) Applicant: Dong Soo Lee, Seoul (KR)

(72) Inventor: Dong Soo Lee, Seoul (KR)

(73) Assignee: Hyun Sang Lee (KR)

( * ) Notice: Subject to any disclaimer, the term of this patent is extended or adjusted under 35 U.S.C. 154(b) by 0 days.

(21) Appl. No.: 15/826,670

(22) Filed: Nov. 29, 2017

(30) Foreign Application Priority Data

Dec. 14, 2016 (KR) .......................... 10-2016-0170398

(51) Int. Cl.
*B29C 37/02* (2006.01)
*B26B 5/00* (2006.01)
*B29L 30/00* (2006.01)

(52) U.S. Cl.
CPC .............. *B29C 37/02* (2013.01); *B26B 5/008* (2013.01); *B29L 2030/002* (2013.01)

(58) Field of Classification Search
CPC .... B29C 37/02; B26B 5/008; B29L 2030/002
USPC ........................................................ 157/13
See application file for complete search history.

(56) References Cited

U.S. PATENT DOCUMENTS

| 2,807,877 | A | * | 10/1957 | Fryer | B29C 37/02 30/280 |
| 2,810,193 | A | * | 10/1957 | Glodde | B29C 37/02 30/280 |
| 2,992,483 | A | * | 7/1961 | Ricci | B29C 37/02 30/280 |
| 4,021,912 | A | * | 5/1977 | Stanfield | B26B 5/008 157/13 |
| 4,358,893 | A | * | 11/1982 | Stanfield | B29C 37/02 30/280 |

FOREIGN PATENT DOCUMENTS

| KR | 100961705 B1 | 6/2010 |
| KR | 101392588 B1 | 5/2014 |
| KR | 20150126273 A | 11/2015 |
| KR | 101675449 B1 | 11/2016 |

* cited by examiner

*Primary Examiner* — Hadi Shakeri
(74) *Attorney, Agent, or Firm* — Renaissance IP Law Group LLP

(57) ABSTRACT

A cutter for trimming a tread of a tire includes a cutting plate which has a plurality of cutting slits sequentially formed at a lower end thereof to cut over-flow rubber formed on the tread of a tire, and a handle coupled to the cutting plate configured for a user to hold to cut the over-flow rubber using the cutting plate. The cutting plate has a plurality of grooves formed on a rear surface thereof to vertically guide and discharge the over-flow rubber cut by the cutting slits for trimming the tread and prevent over-flow rubber discharged in a process of trimming the tire from scattering.

1 Claim, 10 Drawing Sheets

CUTTER FOR TRIMMING TREAD OF TIRE

RELATED APPLICATIONS

This application claims priority to Korean Patent Application No. 10-2016-0170398, filed on Dec. 14, 2016 in the Korean Intellectual Property Office, the entire disclosure of which is incorporated herein by reference.

BACKGROUND OF THE INVENTION

1. Field of the Invention

The present invention relates to a cutter for trimming a tread of a tire, and more particularly, to a cutter for trimming a tread of a tire, which is able to prevent a reduction in a lifespan due to a decrease in hardness of a cutting plate caused by friction heat generated in a process of using the cutter for trimming the tread of a tire, and prevent over-flow rubber discharged in a process of trimming the tire from scattering.

2. Description of the Related Art

In general, when manufacturing tires, green tires are manufactured by forming various types of semi-finished tires in a forming drum to prepare green tires, and then finished tires are manufactured by vulcanizing the prepared green tires in a vulcanizing mold.

The vulcanizing mold is classified into, in accordance with the number of used molds, a 2-piece mold type vulcanizing mold including a top mold and a bottom mold, and a segment mold type vulcanizing mold having two side molds and several tread molds.

Among them, the segment mold type vulcanizing mold has an advantage of being able to vulcanize tires having different tread shapes only by replacing the tread mold while leaving the side mold as it is.

However, the above-described segment mold type vulcanizing mold is used by assembling a plurality of molds, such that there are many joints for jointing the molds, and gaps are generated in the joints by wear and deformation due to repeated use.

On the other hand, rubber leaks through gaps in a process of vulcanizing a green tire, thereby over-flow that is a representative failure on an exterior appearance of tires occurs.

In detail, over-flow rubber generally having a diameter of 1.0 mm and a length of about 10 mm is generated at the tread portion of a finished tire that has been vulcanized, and such over-flow rubber may cause a problem in exterior appearance quality, thereby it is necessary to remove the over-flow rubber.

That is, a worker performs a trimming work of bringing a cutter having a plurality of cutter blades for trimming the tread of a tire in contact with a tread portion of a tire and cutting over-flow rubber off the tread to remove the over-flow rubber.

Meanwhile, not only high durability, a long lifespan, and easy maintenance of cutter blades against wear, but also a guarantee of safety of the worker are required for the cutter for trimming the tread of a tire used for such a trimming work. Further, it is required to secure a precision of work in order to prevent the tread surface of a tire from being unnecessarily damaged during the work.

Furthermore, according to the cutter for trimming the tread of a tire of the related art, there is a problem that the cut over-flow rubber is not smoothly discharged from the cutter for trimming and scattered right and left, whereby it contaminates the working environment and hinders safety for the worker.

SUMMARY OF THE INVENTION

Accordingly, it is an object of the present invention to provide a cutter for trimming the tread of a tire, which is able to prevent a reduction in a lifespan due to a decrease in hardness of a cutting plate caused by friction heat generated in a process of using a cutter for trimming the tread of a tire and to prevent over-flow rubber discharged in a process of trimming the tire from scattering.

In order to achieve the above-described object, there is provided a cutter for trimming a tread of a tire, the cutter including; a cutting plate which has a plurality of cutting slits sequentially formed at a lower end thereof to cut over-flow rubber formed on the tread of a tire; and a handle which is coupled to the cutting plate, and is configured for a user to hold to cut the over-flow rubber using the cutting plate.

Preferably, the cutting plate has a plurality of grooves formed on a rear surface thereof to vertically guide and discharge the over-flow rubber cut by the cutting slits.

Preferably, the cutting plate has a pair of coupling holes formed in an upper portion thereof for coupling the cutting plate to the handle.

Preferably, the cutting plate has a welding hole formed in the upper portion thereof between the pair of coupling holes to couple with the handle by welding.

Preferably, the cutting plate has a plurality of ventholes formed at one end of the grooves.

Preferably, an external air is introduced into the plurality of grooves through the ventholes.

According to the present invention, it is possible to prevent a reduction in a lifespan due to a decrease in hardness of the cutting plate caused by friction heat generated in the process of using the cutter for trimming the tread of a tire.

Further, according to the present invention, it is possible to prevent over-flow rubber discharged in the process of trimming the tire from scattering.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
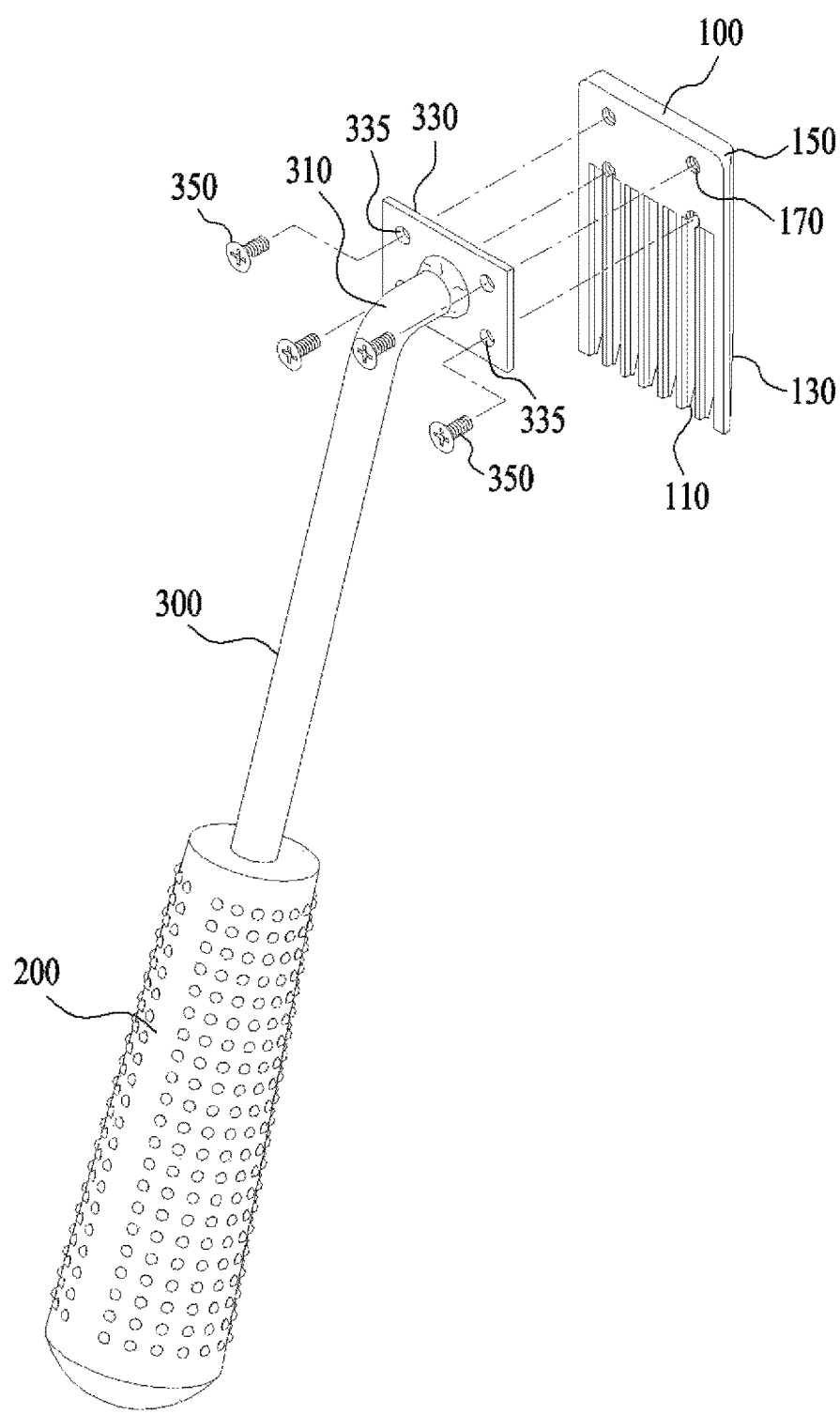
FIG. 1 is an exploded perspective view illustrating a cutter for trimming a tread of a tire according to an embodiment of the present invention.

Hereinafter, the present invention will be described with reference to the accompanying drawings in detail. Referring to the drawings, wherein like reference characters designate like or corresponding parts throughout the several views. In the embodiments of the present invention, the publicly known functions and configurations that are judged to be able to make the purport of the present invention unnecessarily obscure will not be described.

Figure 2:
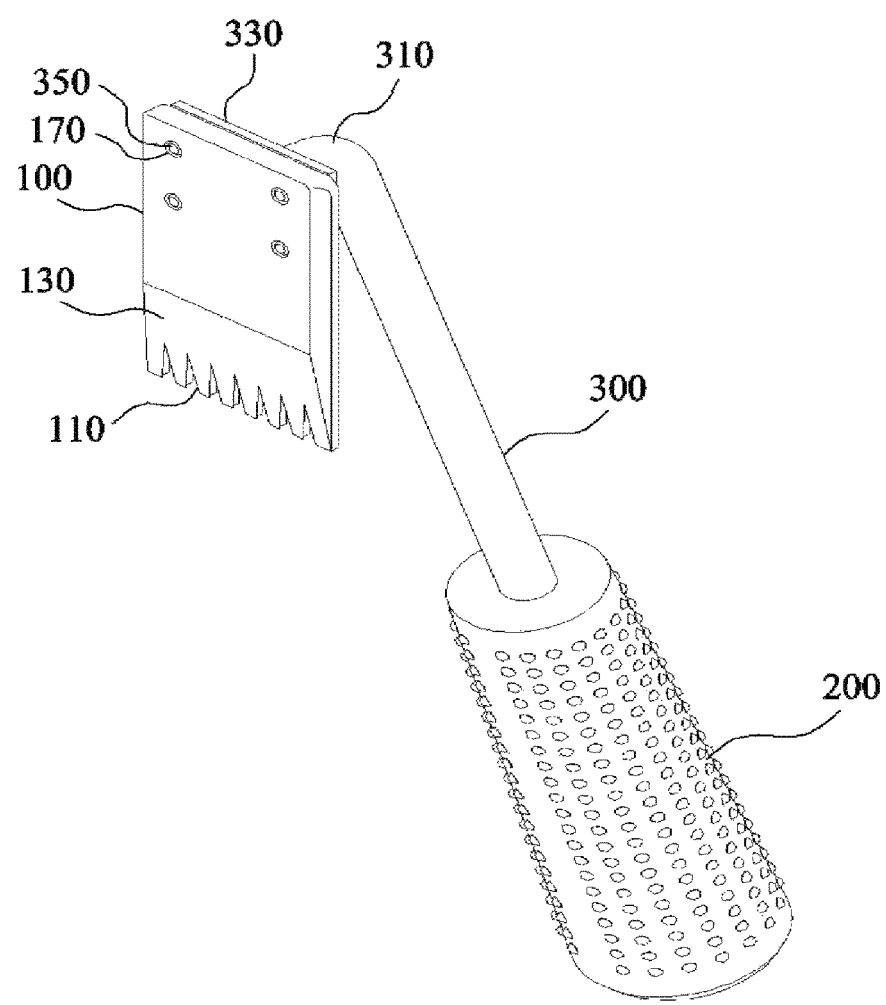
FIG. 2 is a perspective view illustrating the cutter for trimming the tread of a tire according to the embodiment of the present invention with being completely assembled.

FIG. 1 is an exploded perspective view illustrating a cutter for trimming the tread of a tire according to an embodiment of the present invention, and FIG. 2 is a perspective view illustrating the cutter for trimming the tread of a tire according to the embodiment of the present invention with being completely assembled.

Referring to FIGS. 1 and 2, a cutter for trimming the tread of a tire according to the embodiment of the present invention includes a cutting plate 100, a handle 200, and a shank 300.

The cutting plate 100 has a plurality of cutting slits 110 (that is, grooves formed between cutting blades) sequentially formed at a lower end thereof to cut over-flow rubber 450 which is formed on the tread of a tire and is inserted therein. In addition, the cutting plate 100 has a plurality of coupling holes 170 formed at an upper portion thereof to insert fastening members 350 such as fastening bolts or screws for fixing the shank 300 to the cutting plate 100.

Figure 5:
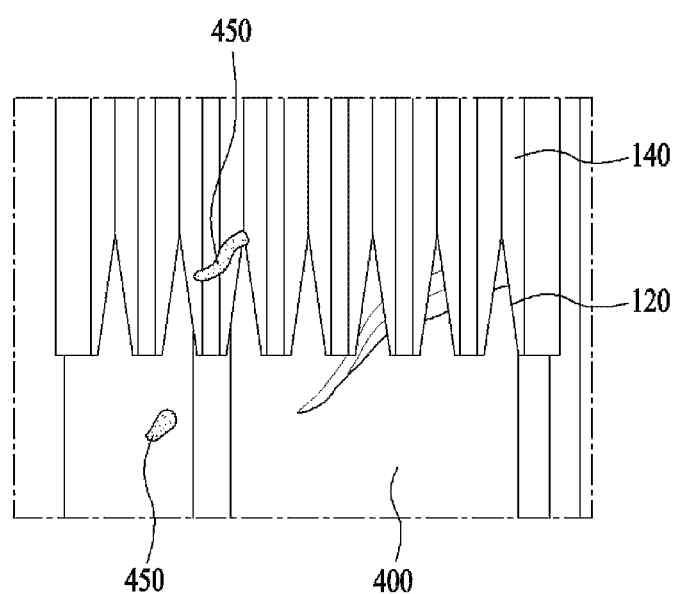
FIG. 5 is a view illustrating a state of using the cutter for trimming the tread of a tire according to the embodiment of the present invention.

The handle 200 is a part that a user holds to cut the over-flow rubber 450 on the tread of a tire, as illustrated in FIG. 5, and the shank 300 is a part connecting the handle 200 with the cutting plate 100, and may be made of a cylindrical iron rod that has a high strength and facilitate thermal treatment such as welding when embodying the present invention.

In detail, the shank 300 is coupled to the handle 200 through a lower end thereof. Further, the shank 300 has an L-shaped bent portion 310 formed at an upper end thereof, and a coupling plate 330 integrally provided at an upper end of the bent portion 310.

The coupling plate 330 integrally provided at the upper end of the shank 300 has a plurality of fastening holes 335 which respectively are formed at positions corresponding to the coupling hole 170 formed in the cutting plate 100. Accordingly, a manufacturer can fix the shank 300 to the cutting plate 100 by placing the coupling plate 330 on a rear surface of the cutting plate 100 and then inserting the fastening members 350 such as fastening screws into the plurality of fastening holes 335 formed in the coupling plate 330 to be fixed.

As described above, the cutting plate 100 may be detachably coupled to the shank 300 in the present invention, thereby allowing a worker to easily replace only the cutting plate 100 according to a level of abrasion and deformation of the cutting plate 100.

Further, according to the present invention, the manufacturer forms the bent portion 310 at the upper end of the shank 300 of the cylindrical iron rod, etc. through thermal deformation, attaches the coupling plate 330 having a metal plate form to the upper end of the bent portion 310 through a welding work, and then attaches the cutting plate 100 to the coupling plate 330 using the fastening members 350, such that heat generated during the welding work is not transmitted to the cutting plate 100 in a process of manufacturing the cutter for trimming the tread of a tire according to the present invention. Thereby, it is possible to prevent a reduction in a performance due to a thermal deformation of the cutting plate 100 and a change in a strength caused by the thermal deformation.

Figure 3:
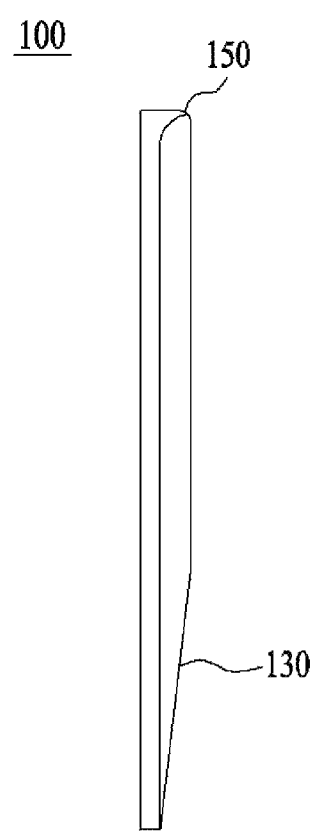
FIG. 3 is a side view illustrating a structure of a cutting plate of the cutter for trimming the tread of a tire according to the embodiment of the present invention.

FIG. 3 is a side view illustrating a structure of the cutting plate 100 of the cutter for trimming the tread of a tire according to the embodiment of the present invention. As illustrated in FIG. 3, the cutting plate 100 of the cutter for trimming the tread of a tire according to the embodiment of the present invention has an inclined plane 130 formed at the front lower portion thereof, which is provided with the cutting slits 110.

Accordingly, the worker can easily cut the over-flow rubber 450 using a principle of leverage by inserting the over-flow rubber 450 into the cutting slits 110, bringing the inclined plane 130 in contact with a working plane, and in this state, then pulling up the same so that a vertical plane formed at front upper portion of the cutting plate 100 comes in contact with the working plane (that is, so that the inclined plane 130 is spaced apart from the working plane).

Further, as illustrated in FIG. 3, the cutting plate 100 of the cutter for trimming the tread of a tire according to the embodiment of the present invention has a rounded portion 150 formed at the front upper end thereof. Thereby, it is possible to prevent the working plane of a tire 400 from being damaged by an upper edge of the cutting plate 100, as well as prevent the worker from being injured by the upper edge of the cutting plate 100 during working.

Furthermore, since the cutting plate 100 according to the present invention has the rounded portion 150 formed at the front upper end thereof, the worker can easily control an angle of the cutting plate 100 with the rounded portion 150 being supported by the working plane of the tire as necessary. Thereby, it is possible to enhance the convenience of the worker during working.

Figure 4:
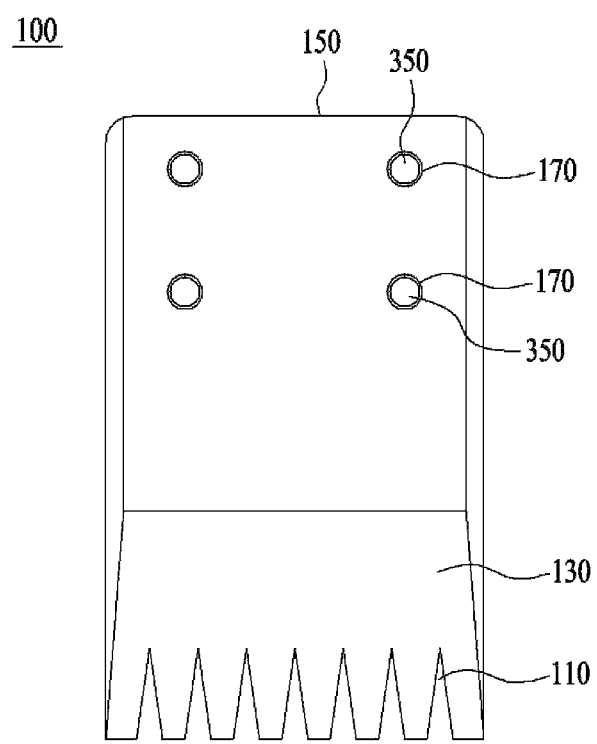
FIG. 4 is a front view illustrating the structure of the cutting plate of the cutter for trimming the tread of a tire according to the embodiment of the present invention.

FIG. 4 is a front view illustrating the structure of the cutting plate 100 of the cutter for trimming the tread of a tire according to the embodiment of the present invention.

Referring to FIG. 4, in the cutter for trimming the tread of a tire according to the embodiment of the present invention, the cutting plate 100 is provided with the coupling holes 170 for attaching with the coupling plate 330. Herein, the coupling holes 170 includes a plurality of upper coupling holes 170 formed in a line at the upper portion of the cutting plate 100, and a plurality of lower coupling holes 170 formed in a line under the upper coupling holes 170 in parallel thereto.

As described above, the coupling holes 170 for attaching with the coupling plate 330 are arranged in divided two lines, the cutting plate 100 and the coupling plate 330 may be maintained with being firmly coupled to each other without separating, even if a vertical eccentric force is applied to a coupling plane between the cutting plate 100 and the coupling plate 300 during the working process.

Meanwhile, since the fastening members 350 are inserted in the coupling holes 170 penetrated in the cutting plate 100, as illustrated in FIG. 4, the coupling holes 170 are contracted by heat generated in the cutting plate 100 during the working process, such that the fastening members 350 may be maintained with being more firmly coupled in the coupling holes 170.

FIG. 5 is a view illustrating a state of using the cutter for trimming the tread of a tire according to the embodiment of the present invention. As illustrated in FIG. 5, the cutting plate 100 of the cutter for trimming the tread of a tire according to the embodiment of the present invention has cutter blades 120 formed at the lower end thereof and guide grooves 140 formed on the rear surface thereof.

The cutter blades 120 are formed in a V-shaped tooth structure in such a manner that an inlet for entering the over-flow rubber 450 is narrow whereas the inside is wide, thereby easily removing the over-flow rubber 450.

Further, the lower side of the cutting plate 100 that comes in contact with the tread surface of a tire is formed in a flat surface, whereas the cutter blades 120 is formed in the inclined plane 130, such that the front ends of the cutter blades 120 are not brought in contact with the tread surface of the tire 400.

That is, the over-flow rubber 450 on the tire 400 is inserted between the cutter blades 120 with being in contact with the tread surface of the tire to be cut, and the cut over-flow rubber 450 is guided and discharged through the guide grooves 140.

Figure 6:
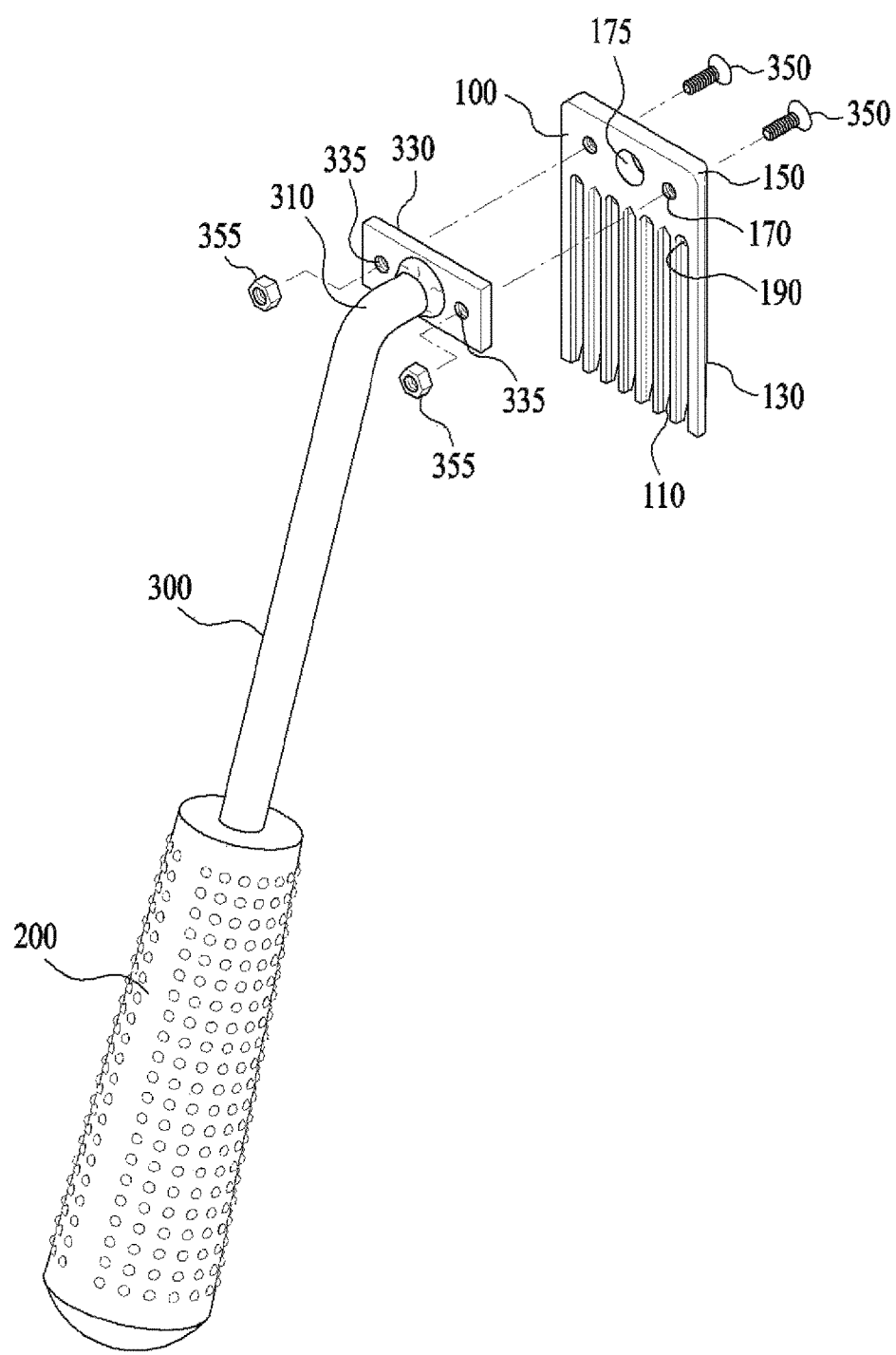
FIG. 6 is an exploded perspective view illustrating a cutter for trimming the tread of a tire according to another embodiment of the present invention.
Figure 7:
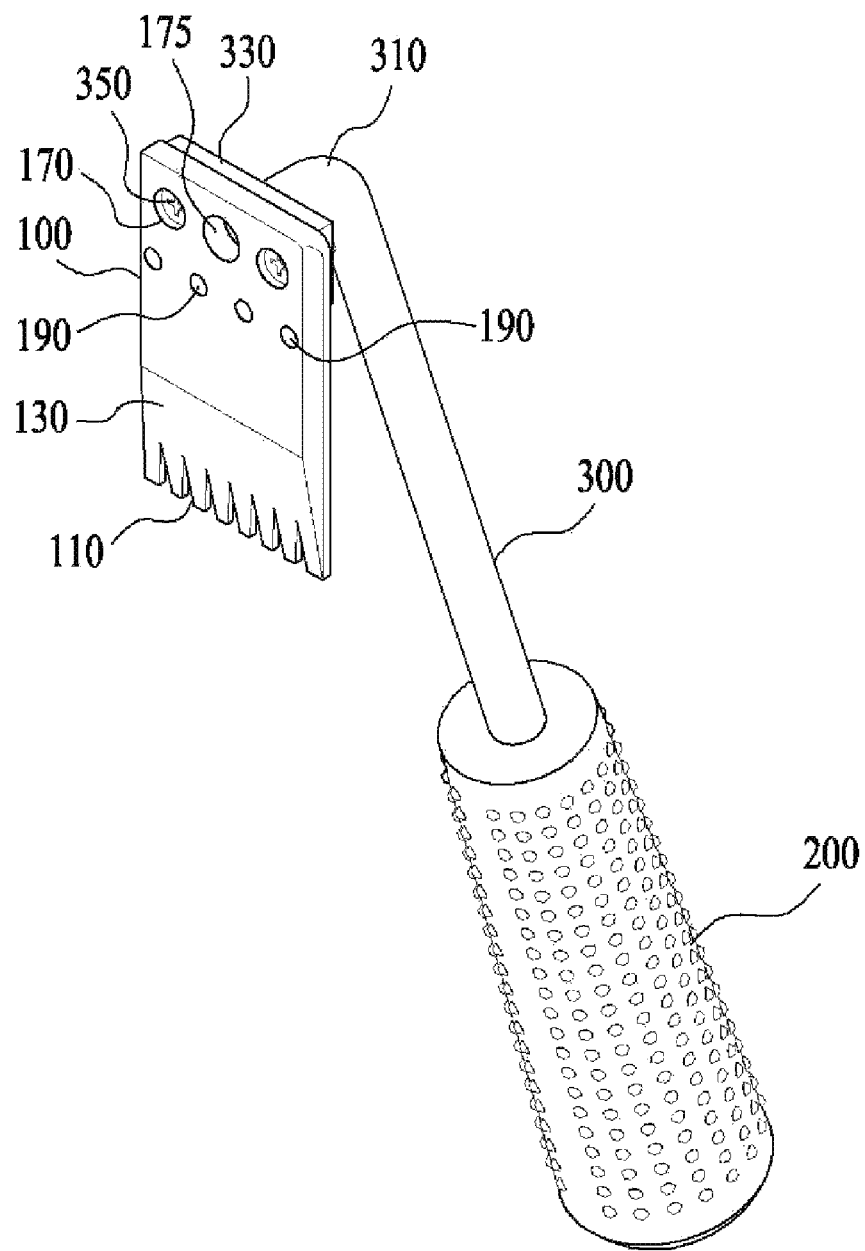
FIG. 7 is a perspective view illustrating the cutter for trimming the tread of a tire according to another embodiment of the present invention with being completely assembled.

FIG. 6 is an exploded perspective view illustrating a cutter for trimming the tread of a tire according to another embodiment of the present invention, and FIG. 7 is a perspective view illustrating the cutter for trimming the tread of a tire according to another embodiment of the present invention with being completely assembled.

Referring to FIGS. 6 and 7, the cutter for trimming the tread of a tire according to another embodiment of the present invention includes a cutting plate 100, a handle 200, and a shank 300.

The cutter for trimming the tread of a tire according to another embodiment of the present invention with being completely assembled illustrated in FIGS. 6 and 7 is different from the cutter for trimming the tread of a tire according to the embodiment of the present invention illustrated in FIGS. 1 and 2 in terms of the number and positions of the coupling holes 170 formed in the cutting plate 100.

Figure 8:
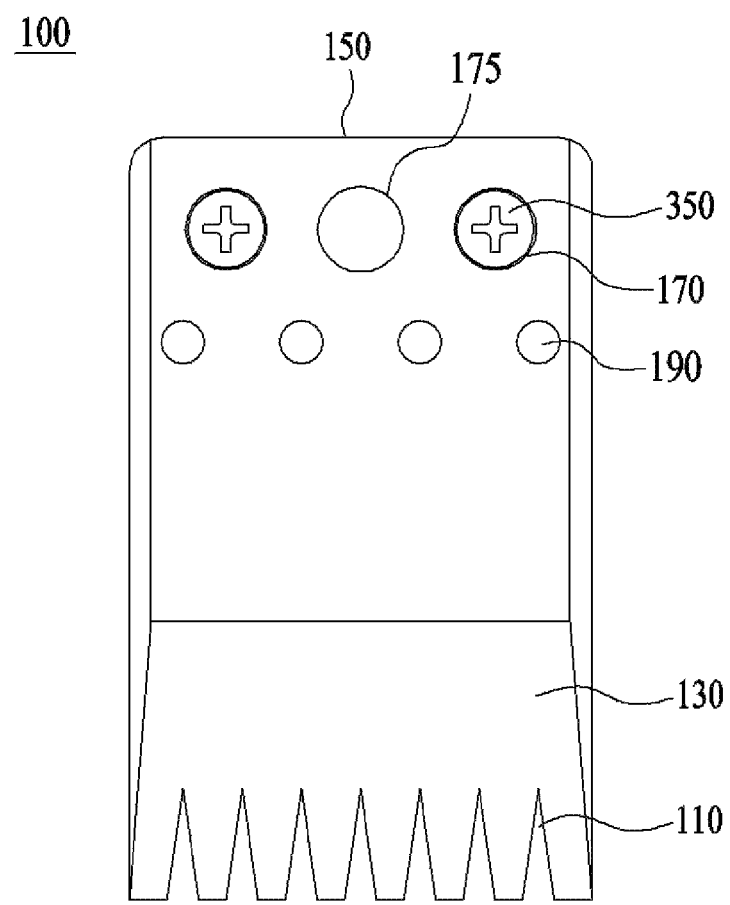
FIG. 8 is a front view illustrating a structure of a cutting plate of the cutter for trimming the tread of a tire according to another embodiment of the present invention.

In detail, as illustrated in FIG. 8, in the cutter for trimming the tread of a tire according to another embodiment of the present invention, the cutting plate 100 has two coupling holes 170 formed in the upper portion thereof in a line. In this case, a manufacturer fixes the cutting plate 100 to a coupling plate 330 by inserting fastening members 350 such as bolts and screws into the coupling holes 170 formed in the coupling plate 100, and then screwing the same with fixing members 350 such as nuts.

As described above, since the manufacturer inserts the fastening members 350 into the coupling holes 170 formed in the cutting plate 100 and then adjusts a degree of turning of the fastening members 350 such as screws, it is possible to prevent the tread surface of the tire 400 from being damaged during the work process due to heads of the screws protruding from the front of the cutting plate 100.

Further, since the cutting plate 100 is provided with the coupling holes 170, as illustrated in FIG. 8, a weight of the cutting plate 100 is reduced, such that it is advantageous for long-time working, and thermal conductivity during the cutting work is reduced, such that the hardness of the cutting plate 100 may be maintained. In addition, the manufacturer can perform the coupling work by welding the cutting plate 100 with the coupling plate 330 through the coupling holes 170, as necessary, such that it is possible to conveniently manufacture the product and improve durability of the product.

Further, the cutting plate 100 of the cutter for trimming the tread of a tire according to another embodiment of the present invention has a welding hole 175 formed in the upper portion thereof between the pair of coupling holes 170 for facilitating welding with the handle 200.

Thereby, the manufacturer can couple the rear surface of the cutting plate 100 to the coupling plate 330 by welding through the welding hole 175.

In detail, the welding hole 175 is a working hole for welding and a welding rod is prevented from separating by the inner side of the welding hole 175, such that safety for the worker during working may be improved.

Further, the weight of the cutting plate 100 is reduced due to the welding holes 175 provided in the cutting plate 100 as illustrated in FIG. 8, such that it is advantageous for long-time working, and thermal conductivity may be reduced during the cutting work, thereby maintaining the hardness of the cutting plate 100.

Further, the inner side of the welding hole 175 may be tapped so that the welding hole 175 has the shape and function of a female screw in screwing. In this case, the worker may selectively employ a bolt/nut fastening type that uses the coupling hole 170 using the welding hole 175 without welding through the welding hole 175, as necessary.

Figure 9:
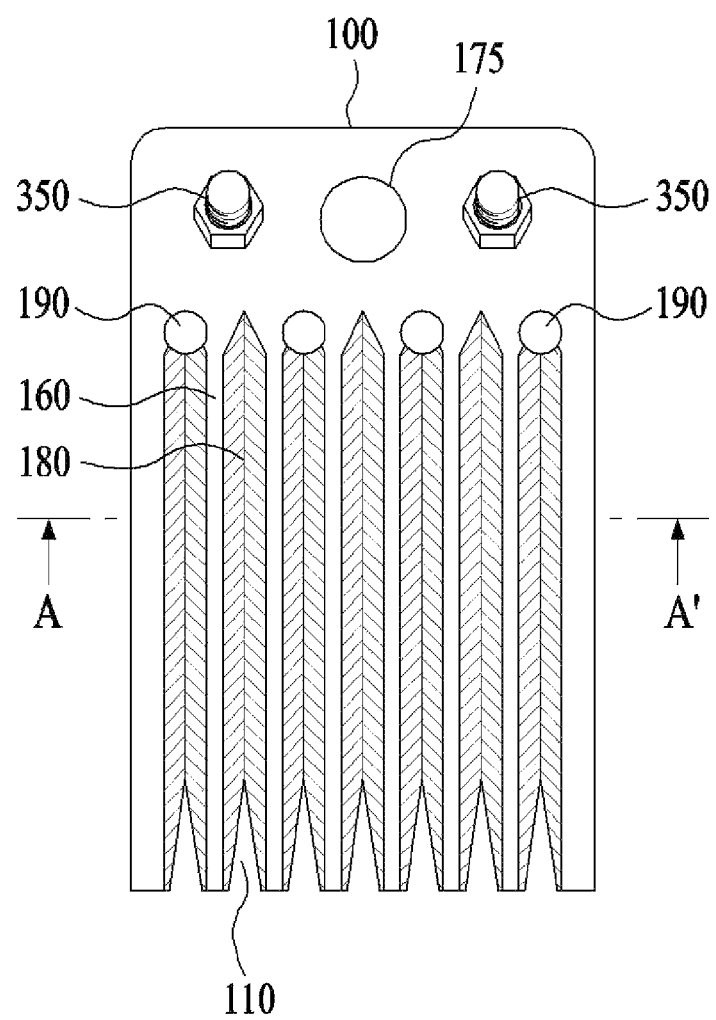
FIG. 9 is a rear view illustrating the structure of the cutting plate of the cutter for trimming the tread of a tire according to another embodiment of the present invention.
Figure 10:
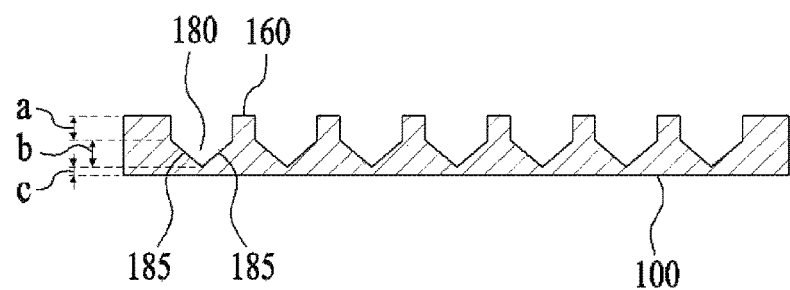
FIG. 10 is a cross-sectional view taken along line A-A' of FIG. 9.

FIG. 9 is a rear view illustrating the structure of the cutting plate of the cutter for trimming the tread of a tire according to another embodiment of the present invention, and FIG. 10 is a cross-sectional view taken along line A-A' of FIG. 9.

As in FIGS. 9 and 10, the cutting plate 110 of the cutter for trimming the tread of a tire according to another embodiment of the present invention has a plurality of grooves 180 formed on the rear surface thereof while extending from cutting slits 110. Over-flow rubber 450 that is cut by the cutting slits 110 illustrated in FIGS. 9 and 10 is smoothly discharged vertically upward along the grooves 180 communicated with the cutting slits 110, respectively, such that it is possible to more precisely cut the over-flow rubber 450, as well as prevent the over-flow rubber 450 from scattering around the working space.

Preferably, as illustrated in FIG. 9, the cutting plate 100 has ventholes 190 formed in the upper end portions thereof above the grooves 180 with being penetrated the cutting plate 100.

Since tires are rotated at a high speed on the front of the cutting plate 100, airflow, in which air inside the grooves 180 is discharged from the rear surface to the front surface of the cutting plate 100 through the ventholes 190, is generated.

Due to the airflow generated inside the grooves 180, it is possible to prevent the over-flow rubber 450 from coming off the grooves 180 and scattering around the working space.

In addition, since external air is continuously supplied inside the grooves 180, the rear surface of the cutting plate 100 may be cooled by the air in an air cooling manner, such that it is possible to prevent a reduction in the lifespan due to a decrease in the hardness of the cutting plate 100 caused by friction heat generated during rotating the tire.

Further, by the airflow generated inside the grooves 180, it is possible to prevent the over-flow rubber 450 from sticking to the insides of the grooves 180.

Furthermore, since the ventholes 190 are provided in the cutting plate 100, the weight of the cutting plate 100 is reduced, such that it is advantageous for long-time working, and thermal conductivity may be reduced during the cutting work, thereby maintaining the hardness of the cutting plate 100.

Meanwhile, for embodying the present invention, it is preferable to form the ventholes 190 alternately at the grooves 180, as illustrated in FIG. 9, rather than at all of the grooves 180 in order to prevent a decrease in the hardness of the cutting plate 100 due to the ventholes 190.

Further, for embodying the present invention, it is possible to select and use one of two ventholes 190 as the coupling hole 170 illustrated in FIG. 1 so that the venthole 190 can also perform the function of the coupling hole 170. As a result, it is possible to achieve an effect of more firmly coupling the cutting plate 100 through a total of four coupling holes 170, as in FIG. 1.

Meanwhile, for embodying the present invention, it is preferable that the grooves 180 have a maximum depth 'b' of 2 mm to 3 mm in FIG. 10.

Further, as illustrated in FIGS. 9 and 10, the cutting plate 100 has a projective guide bar 160 having a predetermined width (of 1 mm to 2 mm, for example), and a predetermined height 'a' (of 2 mm to 3 mm, for example) formed on the rear surface thereof between a groove 180 and an adjacent groove 180.

The guide bars 160 perpendicularly protruding from the rear surface of the cutting plate 100 function as anti-scattering walls that prevent the over-flow rubber 450 discharged through the grooves 180 from scattering right and left.

Further, the guide bars 160 protruding between the grooves 180 makes the airflow in the grooves 180 smoother so that the over-flow rubber 450 is more smoothly discharged vertically upward along the grooves 180 (in a longitudinal direction of the guide bars 160).

That is, in the present invention, discharge guide furrows having a pentagonal cross-section shape and guiding the over-flow rubber 450 to be discharged are formed by the grooves 180 and the guide bars 160, as illustrated in FIG. 10. According to the discharge guide furrows having the pentagonal cross-section shape to discharge the over-flow rubber 450, friction of the over-flow rubber 450 with the rear surface of the cutting plate 100 may be minimized by the pentagonal structure with the top open during discharging the same, and more effective ventilation structure may be secured, such that it is possible to the over-flow rubber 450 from being stuck during the discharging process.

Furthermore, top faces of the guide bars 160 are formed in a horizontal plane orthogonal to side faces thereof, as illustrated in FIG. 10, it is possible to solve the problem that when the top faces of the guide bars 160 are curved, the over-flow rubber 450 easily scattering right and left through the curved top faces of the guide bars 160.

Meanwhile, for embodying the present invention, it is preferable that the guide bars 160 have a plurality of grooves (not illustrated) formed therein in parallel to each other in the longitudinal direction thereof so that the over-flow rubber 450 may be more smoothly discharged by the guide bars 160 in a vertical direction (in the longitudinal direction of the guide bars 160).

In addition, the grooves (not illustrated) longitudinally formed in the side faces of the guide bars 160 prevent the over-flow rubber 450 from coming off the rear surface of the cutting plate 100 through a frictional force applied to the over-flow rubber 450, thereby preventing the over-flow rubber 450 from scattering toward the top faces of the guide bars 160 out of the guide bars 160.

Further, for embodying the present invention, it is possible to form the grooves formed in the side faces of the guide bars 160 in a wave shape spaced at a predetermined interval from each other, so that the effect of preventing the over-flow rubber 450 from scattering is enhanced by the side face structures of the guide bars 160.

Meanwhile, as illustrated in FIG. 10, the grooves 180 have inclined bottom faces 185 formed at bottoms thereof in an asymmetrically V shape. As such, the grooves 180 have the inclined bottoms, thereby it is possible to prevent the problem in the related art that the cut over-flow rubber 450 is inserted deep inside the grooves 180 to be stuck to the bottom faces thereof without being smoothly discharged to an outside.

Further, for embodying the present invention, it is also possible to form a plurality of grooves (not illustrated) in parallel to each other in the longitudinal direction in the asymmetrically inclined bottom faces 185 of the grooves 180, so that the over-flow rubber 450 is more smoothly discharged by the grooves 180 in the vertical direction (in the longitudinal direction of the grooves 180).

Furthermore, for embodying the present invention, it is preferable that the grooves 180 have a depth 'b' formed in such a manner that the depth 'b' is largest on the cutting slit 110 side and is gradually decreased toward a side opposite to the cutting slit 110. As a result, during vertically discharging of the over-flow rubber 450 cut in the cutting slits 110 along the grooves 180, the over-flow rubber 450 may drop to the floor of a work site from the grooves 180 as apart from the cutting slits 110 due to gravity.

That is, for embodying the present invention, it is preferable that the edges that are the lines where the bottom faces 185 formed in an asymmetrically inclined V shape meet each other of the grooves 180 are also inclined in a direction in which the grooves 180 extend.

Meanwhile, for embodying the present invention, it may be configured in such a manner that the grooves 180 has a depth 'b' which is constantly maintained in a predetermined section (for example, 80% of the entire length of the grooves), but is gradually decreased only in a section right before the grooves 180 ends on the side opposite to the cutting slits 110 (for example, the last 20% section of the entire length of the grooves). As a result, the over-flow rubber 450 moving through the grooves 180 may drop to the floor of the work site from the grooves 180 due to gravity while reaching the ends of the grooves 180.

The terminology used herein is for the purpose of describing particular embodiments only and is not intended to limit the present invention thereto. As used herein, the singular forms "a," "an" and "the" are intended to include the plural forms as well, unless the context clearly indicates otherwise.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

While the present invention has been described with reference to the preferred embodiments and modified examples, the present invention is not limited to the above-described specific embodiments and the modified examples, and it will be understood by those skilled in the related art that various modifications and variations may be made therein without departing from the scope of the present invention as defined by the appended claims, as well as these modifications and variations should not be understood separately from the technical spirit and prospect of the present invention.

DESCRIPTION OF REFERENCE NUMERALS

100: cutting plate, 110: cutting slit
120: cutting blade, 130: inclined plane
140: groove, 150: rounded portion
160: guide bar, 170: coupling hole
175: welding hole, 180: groove
185: groove bottom face, 190: venthole
200: handle, 300: shank
310: bent portion, 330: coupling plate
335: fastening hole, 350: fastening member
355: fixing member, 400: tire
450: over-flow rubber, a: height of guide bar
b: depth of groove, c: thickness from front of cutting plate to groove

What is claimed is:

1. A cutter for trimming a tread of a tire, the cutter comprising;
   a cutting plate (100) which has a plurality of cutting slits (110) sequentially formed at a lower end thereof to cut over-flow rubber (450) formed on the tread of a tire; and
   a handle (200) which is coupled to the cutting plate (100), and is configured for a user to hold to cut the overflow rubber (450) using the cutting plate (100),
   wherein the cutting plate (100) has a plurality of grooves (180) formed on a rear surface thereof and respectively extending from the plurality of the slits to vertically guide and discharge the over-flow rubber (450) cut by the plurality of cutting slits (110),
   the cutting plate (100) has a pair of coupling holes (170) formed in an upper portion thereof for coupling the cutting plate (100) to the handle (200),
   the cutting plate (100) has a welding hole (175) formed in the upper portion thereof between the pair of coupling holes (170) to couple with the handle (200) by welding,
   ventholes (190) are formed at one end of the grooves (180) opposite the slits, and
   an external air is introduced into the plurality of grooves (180) through the ventholes (190).

* * * * *